United States Patent [19]

Oshima et al.

[11] Patent Number: 4,522,172

[45] Date of Patent: Jun. 11, 1985

[54] DIRECT INJECTION INTERNAL COMBUSTION ENGINE OF COMPRESSION IGNITION TYPE

[75] Inventors: Yujiro Oshima; Taro Aoyama, both of Aichi, Japan

[73] Assignee: K.K. Toyota Chuo Kenkyusho, Aichi, Japan

[21] Appl. No.: 512,055

[22] Filed: Jul. 8, 1983

[30] Foreign Application Priority Data

Jul. 9, 1982 [JP] Japan ................. 57-120195

[51] Int. Cl.$^3$ ................................. F02B 3/00
[52] U.S. Cl. ................................. 123/276; 123/259; 123/262; 123/263
[58] Field of Search ............... 123/276, 259, 262, 263; 239/533.12

[56] References Cited

U.S. PATENT DOCUMENTS

| | | | |
|---|---|---|---|
| 2,316,887 | 4/1943 | Pate | 123/276 |
| 4,015,577 | 4/1977 | Elsbett | 123/276 |
| 4,083,330 | 4/1978 | Morris | 123/276 |
| 4,365,746 | 12/1982 | Tanasawa | 239/533.12 |
| 4,392,465 | 7/1983 | Wolters | 123/276 |
| 4,428,340 | 1/1984 | Nikly | 123/276 |

FOREIGN PATENT DOCUMENTS

| | | | |
|---|---|---|---|
| 1526334 | 6/1969 | Fed. Rep. of Germany | 123/276 |
| 807801 | 1/1937 | France | 123/276 |
| 117309 | 9/1946 | Sweden | 123/276 |

*Primary Examiner*—Ronald B. Cox
*Attorney, Agent, or Firm*—Sughrue, Mion, Zinn, Macpeak & Seas

[57] ABSTRACT

A direct injection internal combustion engine of a compression ignition type uses swirl injection nozzle having relatively small penetration and relies on the combination of an intake swirl and compression squish flow as well as a substantial fuel spray angle to uniformly distribute fuel throughout the interior of a throttled combustion cavity recessed in the piston.

12 Claims, 12 Drawing Figures

DIRECT INJECTION INTERNAL COMBUSTION ENGINE OF COMPRESSION IGNITION TYPE

BACKGROUND OF THE INVENTION

1. Field of the Invention

The present invention relates to a direct injection internal combustion engine of a compression ignition type in which a piston top surface is formed with a cavity so that fuel may be directly injected into the cavity.

2. Description of the Prior Art

A direct injection internal combustion engine of the compression ignition type, in which a piston top surface is formed with a recess (which will be termed as a "cavity") to thereby form a combustion chamber, is frequently used as a large-sized engine because it is advantageous over a compression ignition type internal combustion engine having a swirl chamber and a pre-combustion chamber, in that it has no communication channel between the main and auxiliary chambers of the combustion chambers and can have a relatively low compression ratio.

However, small-sized engines having small cylinder diameters suffer more from problems in the formation of the air-fuel mixture than do the large-sized engines.

In the direct injection internal combustion engine of a compression ignition type according to the prior art, more specifically, a fuel injection nozzle is arranged, as shown in FIG. 1, generally at the center of cavity C formed in the top surface of a piston P so that a plurality of fuel sprays may be radially injected from a plurality of injection ports. The swirling flow (or swirl), which has been generated by the port of the intake valve during the suction stroke of the engine, still resides even at the end of the compression stroke, so that it prepares the mixture while swirling the fuel spray (in the direction of the arrow in FIG. 1) within the cavity C, as shown. The diameter of cavities generally used is within the range of 40 to 70% that of the piston P or the cylinder. In a small-sized engine in which the piston P has a diameter of not more than 100 mm, the diameter of the cavity C is small and is reduced to a smaller value if it is intended to further enlarge the compression ratio. As a result, the fuel spray, which has been radially injected from the plural injection ports of the fuel injection nozzle, impinges upon the inner wall surface of the cavity C, as shown in FIG. 2, to wet the wall surface in the form of a liquid film or coarse droplets so that it will not be effectively burned. As a result, the mixture effective for combustion is reduced to invite problems such as a reduction in the output power and mileage or the generation of smoke.

In order to prevent the fuel from impinging upon the cavity wall surface, there are generally adopted a method (a), by which the swirling flow to be generated in the combustion chamber is intensified; a method (b), by which the fuel injection nozzle has its injection ports reduced in size but increased in number; and a method (c), by which the compression ratio is increased to raise the pressure (or air density) in the cavity C at the timing of the fuel injections so that the spray penetration of the fuel injection nozzle may be weakened.

According to method (a), in the engine having a cylinder diameter of 100 to 120 mm, the swirl ratio (which is a measure of the intensity of the swirl to be generated in the combustion chamber; swirl velocity/mean piston speed) is about 4, and is limited to about 3.5 to 3.6 for an engine having a cylinder diameter not larger than 90 mm. If the swirl ratio is made more than the above-specified value, on the contrary, there arises a problem in that the resistance of the intake port to the air is augmented to remarkably degrade the volumetric efficiency of the engine.

In method (b), if the injection port of the fuel injection nozzle is made small, the fuel is atomized to weaken its penetration, but the injection port is liable to be clogged, if it is made too small, so that a practical problem is raised for injection ports having a size not larger than 0.15 mm. If the number of the injection ports is increased, on the other hand, the sprays having been injected from adjoining injection ports merge in the vicinity of the side wall of the cavity C (as hatched in FIG. 1), as shown by a broken line, thereby raising a problem in that an overrich region of the fuel is locally formed to cause the smoking phenomenon. In an engine having a cylinder diameter not smaller than 120 mm, the number of the injection ports is generally 4 or 5.

In method (c), the compression ratio is determined by the ratio between the whole clearance volume at bottom dead center and the clearance volume at top dead center. In the direct injection internal combustion of the compression ignition type therefore, the volume of the cavity has to be not less than 70% of the clearance volume so that a sufficient output power may be generated. In order to increase the compression ratio, therefore, the clearance between the cylinder head and the piston top surface as is not contributable to combustion is desirably made as small as possible. However, the above-specified clearance has a lower limit of about 0.5 mm if the thermal expansions of the engine parts due to combustion and product errors are taken into consideration. As a result, there arises a problem in that the compression ratio cannot be made higher for the smaller engine, or that the assembly and adjustment of the engine become difficult if the compression ratio used is high.

We, the Inventors, have succeeded in reaching the present invention by repeating systematic experiments, analyses and trials so that the problems concomitant with the small-sized the direct injection internal combustion engine of compression ignition type thus far described in the prior art might be solved.

From the experiments and analyses mentioned above, we have succeeded in obtaining the following findings.

The conditions of the direct injection internal combustion engine of the compression ignition type of the prior art for preparing the air-fuel mixture had to satisfy the following four items.

(1) Atomization

Gasification and combustion are effected more promptly if the fuel droplets are smaller. Therefore, the fuel droplets injected from the fuel injection nozzle have to be made small.

(2) Penetration

The fuel droplets are enclosed by the combustion gas, if they stand still in the combustion chamber, so that the combustion does not proceed. Therefore, the fuel droplets are required to have a force by which they advance into the combustion chamber till the end of combustion.

(3) Fuel Distribution

In order that the fuel may be burned as much as possible in the combustion chamber, without smoke, to ensure a high mean effective pressure, the air in the cylinder has to be consumed to the last during combustion. The air at a place where the fuel droplets fail to reach is not used in the least, whereas the air becomes short at places where the fuel droplets are dense, thereby inviting incomplete combustion. Thus, the fuel droplets are required to migrate to every corner of the combustion chamber so that they may be uniformly distributed as a whole.

(4) Burning Velocity

The fuel spray injected from the fuel injection nozzle diverges while advancing in the combustion chamber. This divergence is determined by the penetration and the distribution. With only this diffusion, however, combustion requires a long time, and it is difficult to complete combustion within an effective combustion period. Therefore, it is necessary to impart a swirling flow (or vortex) to the intake air thereby to accelerate the burning velocity.

The conditions (1) to (3) described above are directed to fuel injection. That is, the fuel droplets play a great role in the dispersion (or mixture preparation) of the spray by the fuel injection. In other words, the fuel droplets atomized prepare the mixture while being properly distributed and advancing at a sufficient velocity within the combustion chamber. In the direct injection internal combustion engine of the compression ignition type of the prior art, therefore, it is commonly accepted that an injection nozzle having weak penetration cannot be used.

According to our experimental analyses, it has been revealed that the theory of mixture preparation of the direct injection internal combustion engine of the compression ignition type according to the prior art has the following inconsistencies:

(a) The penetration is weakened if the fuel droplets are made small; and
(b) The penetration is weakened if the angle of spray angle is enlarged so as to improve the distribution of the fuel in the combustion chamber.

Consequently, an intense swirling flow in the combustion chamber and a high compression (or air density) are required for reducing the size of the fuel droplets and to improve the distribution of the same without reducing the reach of the fuel spray.

Therefore, we have changed the mixture preparation concept such that the fuel injection nozzle is made in the present invention to share the functions of spraying the fuel and distributing the fuel widely over the projected plane in the combustion chamber, but is not expected to effectuate penetration. Therefore, the fuel droplets having been injected from the fuel injection nozzle may stand still at their respective positions unless there is a flow of intake air within the combustion chamber. The fuel droplets are intensely blown in the depthwise direction into the combustion chamber, while retaining the burning velocity, by the coaction of the swirling flow, which is established in the combustion chamber and which flows down while swirling, and the intense flow (or the squish) which enters the cavity from the flat portion of the piston top surface. In other words, the fuel injection nozzle is made to share the function of dispersing the fuel spray in the direction of the flat surface (or the projected plane) of the cavity, whereas the squish flow is made to share the function of dispersing the fuel spray in the depthwise direction of the cavity.

SUMMARY OF THE INVENTION

An object of the present invention is to provide a direct injection internal combustion engine of a compression ignition type of small size having a small cylinder diameter, in which the mixture preparation is improved to reduce fuel consumption.

The present invention provides a direct injection internal combustion engine of a compression ignition type, in which a piston top surface is formed with a cavity so that fuel may be directly injected into the cavity, said internal combustion engine being characterized in that said cavity formed in said piston top surface is formed so as to have its inlet opening throttled while allowing its remaining portion to have a larger area such that the ratio of the area A of said inlet opening to the area Ao of said piston top surface satisfies the following relationship of $0.07 \leq A/Ao \leq 0.25$; and in that a fuel injection nozzle, which is equipped with fuel swirling means so that the fuel injected from its injection port may have a tangential velocity component, is arranged so as to have its injection port positioned at the central portion of said cavity so that the fuel may be injected from the injection port thereof toward the whole circumferential wall of said cavity in a manner so as to provide a spray pattern of hollowed conical shape having a predetermined angle of spray angle.

The direct injection internal combustion engine of the compression ignition type having the aforementioned construction according to the present invention has an advantage in that the preparation of the air-fuel mixture is improved to make uniform combustion possible, and fuel consumption is reduced because the fuel spray injected from the fuel injection nozzle toward the whole inner circumferential wall of the cavity is dispersed in the depthwise direction of the cavity and uniformly distributed in the cavity by the flow (or squish) which is set to flow with a suitable intensity from the flat surface of the piston top into the cavity.

According to the present invention, more specifically, the fuel is atomized, because it is injected over a wide angle by having a tangential velocity component of a suitable penetration as is not excessively intense but is uniform over the whole horizontal circumference at a suitable portion in the axial direction of the cavity. Afterwords, the fuel, which has been atomized in the axial direction, is dispersed and diffused along the inner wall surface of the cavity and is sufficiently mixed and vaporized with the air by the action of the squish (or flow), which flows into the cavity with an axial (or depthwise) velocity component, so that an excellent mixture is formed throughout the cavity.

Thus, the present invention has advantages in that there is no impingement onto the wall surface of the cavity, differently from the conventional internal combustion engine of the compression ignition type in which the penetration of the fuel spray plays a major role in preparing the mixture, and in that neither a high compression ratio nor a high fuel injection pressure are required. More specifically, the present invention has advantages in that the fuel is freed from having its droplets made coarse or a liquid film formed because the fuel spray does not impinge upon the inner wall surface of the cavity, in that the atomization of the fuel is excellent because the fuel injection nozzle is not required to have penetration, and in that combustion is promoted to completion because the squish flow establishes turbulences. As a result, the present invention has advantages in that the smoking phenomenon is remarkably suppressed while the emission of hydrocarbons (HC), carbon monoxide (CO) and particulate (Ptc) are reduced, and in that ignition delay can be shortened with noises being suppressed to a low level because the fuel spray injected from the fuel injection nozzle is carried by the squish flow to continously distribute the same in the vicinity of the inner wall surface of the cavity. Moreover, the present invention has an advantage in that the engine friction is low to enhance mechanical efficiency, because there is no need of raising the compression ratio, so that the fuel specific consumption can be made low thanks to the aforementioned complete combustion. Thanks to the use of a fuel injection nozzle having low fuel penetration, furthermore, since the swirling velocity can be made low, in case the intake air is to be swirled, so that the intake passage can have a low resistance to the flow for establishing the swirl around its intake port and valve, the present invention has an advantage in that the volumetric efficiency ($\eta v$) of the intake air can be enhanced to increase the amount of air drawn for the same cylinder volume so that the amount of the fuel to be burned at the same excess air ratio can be increased to augment the engine output power.

In the present invention, as shown in FIGS. 3(A) and 3(B), the area ratio A/Ao of the area $A(=\pi/4)d^2$, where d stands for the diameter at the opening of the cavity C) of the the opening of the cavity C formed in the top surface of the piston P to the area $Ao(=\pi/4)Do^2$ wherein Do stands for the diameter of the piston P) of the top surface of the piston P has to satisfy the relationship of the $0.07 \leq A/Ao \leq 0.25$.

Experimental analyses conducted by us have revealed the following findings. That is, the intensity of the flow (or squish) S to be introduced into the cavity C is determined by the ratio (i.e., throttle ratio) of the area A of the opening of the cavity C to the area Ao of the piston P. If this area ratio is too high, the intensity of the squish S to be established is weakened to make ineffective the operation of the present invention of guiding the fuel spray in the depthwise direction along the inner wall surface of the cavity. If the opening area A of the cavity C is reduced to decrease the area ratio A/Ao, on the contrary, the squish S becomes excessively intense to excessively intensify the flow and turbulences in the cavity C to thereby enhance the heat transfer between the combustion gas and the inner wall surface of the cavity C, so that the heat loss is increased with the throttle loss of the combustion chamber, to thereby lose the effect of the direct injection internal combustion engine. Therefore, we have conducted finer experiments and analyses and have reached the conclusion that the operational effects of the present invention as well as the features of the direct injection internal combustion engine are retained by setting the aforementioned area ratio A/Ao within a range of 0.07 to 0.25.

The present invention can adopt the following aspects when put into practice.

According to a first aspect of the present invention, a suction mechanism for supplying intake air into the aforementioned combustion chamber is equipped with a swirling mechanism for swirling the intake air so that a swirling flow is established in the aforementioned cavity.

The first aspect has an advantage in that the dispersion, diffusion and mixing of the fuel into the cavity can be conducted more effectively to prepare a more excellent air-fuel mixture because the swirling flow of the intake air is established in addition to the aforementioned squish within the cavity forming a part of the combustion chamber, so that the fuel is injected into the swirling flow from the fuel injection nozzle.

According to a second aspect of the present invention, as shown in FIGS. 4(A) and 4(B), the spray angle and the position of the injection port of said fuel injection nozzle are determined so that the fuel spray injected from the injection port of said fuel injection nozzle may be directed toward the inner circumferential wall of the cavity below a straight line tl, on which said injection port and the inner wall of the throttled opening of said cavity are tangential, and above a straight line bl which joins said injection port and such a portion of the cavity as has a depth of 0.9L from the opening when the depth of the cavity is denoted by L.

In order to retain the operation of the present invention of guiding the fuel spray in the depthwise direction along the inner wall surface of the cavity by the action of the squish S, the fuel spray injected from the fuel injection nozzle is best for guiding the fuel spray in the depthwise direction along the inner wall surface of the cavity C using the squish S, if it is directed toward a predetermined position in the vicinity of the inner wall surface of the restricted opening of the cavity C. The effect of the squish flow is not of assistance if the angle of spray angle $\theta$ is narrowed until the 0.9L depth position of the cavity C is passed, thereby making it difficult to prepare a satisfactory mixture throughout the cavity C.

On the basis of the aforementioned findings, the second aspect of the present invention has an advantage in that the mixture is effectively prepared over all the entire volume of the cavity C by the action of the squish flow S. Specifically, this second aspect has an advantage in that a uniform mixture can be prepared throughout the cavity C while suppressing ignition delay and noise, because the fuel spray is continuously guided in the depthwise direction of the cavity C along the inner wall surface of the cavity C by the action of the squish flow S flowing into the cavity C if the fuel spray is injected toward the aforementioned predetermined position in the vicinity of the restricted opening of the cavity C.

According to a third aspect of the present invention, the fuel injection nozzle has its injection port arranged so as to face such a region of said cavity having a diameter of 0.5 times as large as that of said opening.

According to the third aspect the fuel spray atomized is injected toward the entire inner circumferential wall of the cavity forming a part of the combustion chamber by arranging the injection port of the fuel injection nozzle at a predetermined position with respect to the opening of the cavity.

According to a fourth aspect of the present invention, the fuel injection nozzle has its injection port substantially aligned with the central axis of the cavity so that it may inject fuel uniformly over the whole circumference of the inner wall of the cavity. As a result, this aspect has an advantage in that an excellent mixture is prepared evenly and uniformly over the whole volume of the cavity.

According to a fifth aspect of the present invention, the fuel injection nozzle has its injection port spaced a predetermined distance from the central axis of the cavity and inclined at a predetermined angle with respect to the central axis of the cavity.

This aspect has advantages in that the fuel spray is injected offset from the central axis of the cavity but is dispersed, diffused and mixed over all the entire volume of the cavity by the swirling flow of the intake air, which is being established in the cavity, thereby preparing an excellent mixture, and in that a fuel injection nozzle having a small angle of spray angle $\theta$ can be used.

BRIEF DESCRIPTION OF THE DRAWINGS

FIG. 5 is a longitudinal section taken along line B—B of FIG. 6 and showing the internal combustion engine of the first embodiment;

FIG. 6 is a transverse section taken along line A—A of FIG. 5 and showing the internal combustion engine of the first embodiment;

FIG. 7 is a longitudinal section showing the swirl injection nozzle of the internal combustion engine of the first embodiment; FIG. 8 is a longitudinal section showing the internal combustion engine of a second embodiment; FIG. 9(A) is a longitudinal section showing the swirl injection nozzle of the internal combustion engine of the second embodiment; and FIG. 9(B) is a transverse section taken along line C—C of FIG. 9(A) and showing the swirl injection nozzle of the second embodiment.

DETAILED DESCRIPTION OF THE PREFERRED EMBODIMENTS

The present invention will now be described more particularly in the following in connection with the embodiments thereof developed briefly above.

The direct injection internal combustion engine of the compression ignition type according to a first embodiment of the invention embodies the first, second, third and fourth aspects described above and is characterized in that a squish and a swirl, both being properly controlled, are established in the combustion chamber, and in that the fuel spray from the fuel injection nozzle arranged on the central axis of the cavity is injected toward the vicinity of the inner wall surface of the opening of the cavity. The internal combustion engine of the first embodiment will be described in detail in the following with reference to FIGS. 5 to 7.

Figure 1:
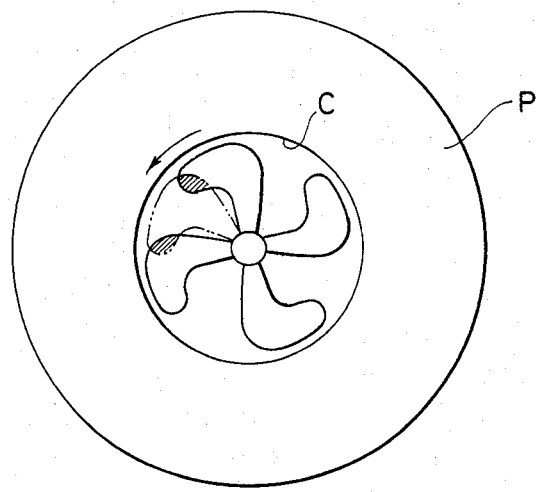
FIGS. 1 and 2 are top plan views illustrating the fuel spray patterns of an internal combustion engine of the prior art.
Figure 2:
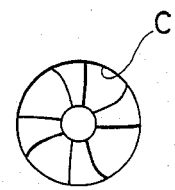
Figure 3A:
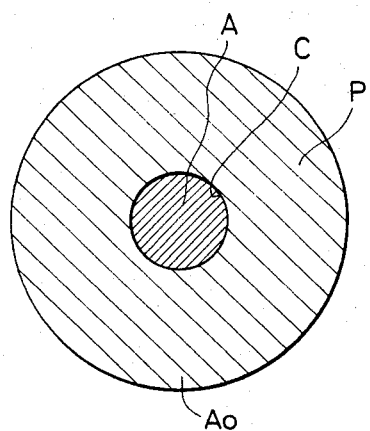
FIGS. 3(A) and 3(B) are a top plan view and a sectional view, respectively, explaining both the relationship of the area ratio of the area of the opening of the cavity to the area of the piston top surface and the squish flow according to the present invention.
Figure 3B:
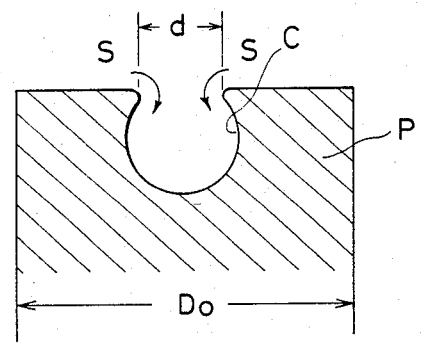
Figure 4A:
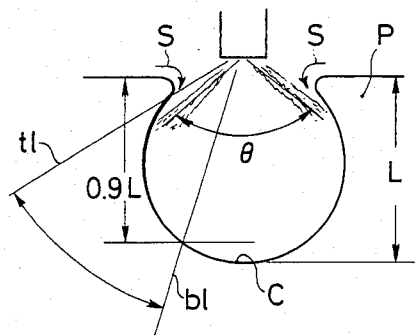
FIGS. 4(A) and 4(B) are sectional views showing the directions and positions of the fuel spray according to a second aspect of the present invention.
Figure 4B:
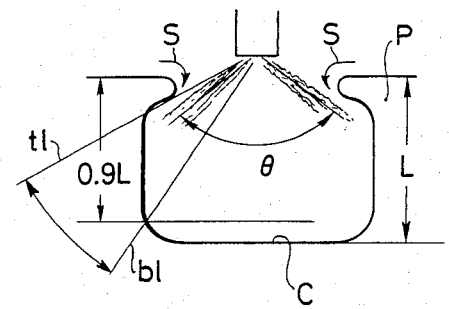
Figure 5:
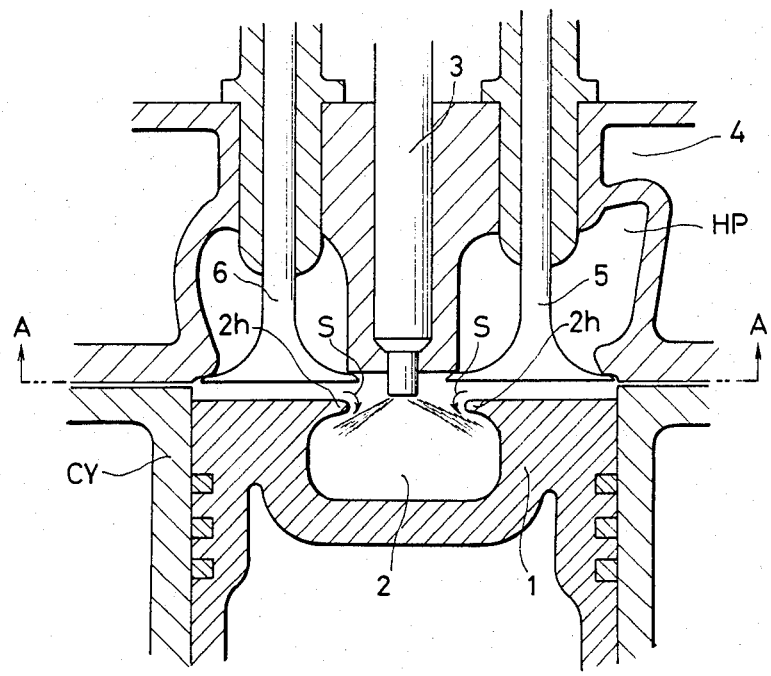
FIGS. 5 to 7 explain an internal combustion engine according to a first embodiment of the present invention.

As shown in FIG. 5, a piston 1 made reciprocally movable within a cylinder CY is formed at the central portion of its flat top surface with a cavity 2 of a bottomed cylindrical shape, which forms a part of the combustion chamber. The area ratio A/Ao of the area A of the opening 2h of the cavity 2 to the area Ao of the piston top surface is set at 0.13. Moreover, the diameter of the opening 2h of the cavity 2 is set to 0.7 or 0.8 times the diameter (i.e., the inner diameter of the cavity 2) of the remaining portion so that the intake air in the cavity may not flow during the compression stroke along the top flat surface of the piston 1.

As shown in FIG. 5, the fuel injection nozzle is composed of a swirl injection nozzle 3 of the slit type, which is arranged to extend through a cylinder head 4 and to have its injection port aligned with the axis of the aforementioned cavity 2.

Figure 7:
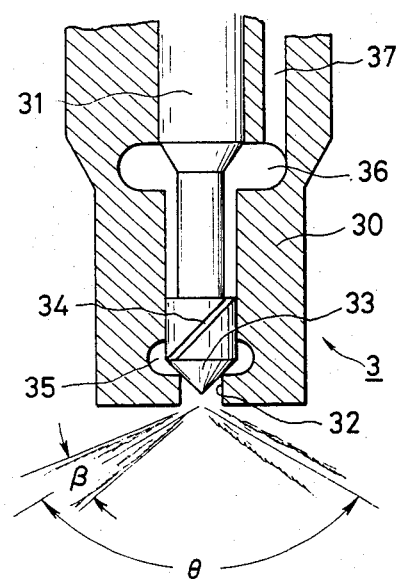

The swirl injection nozzle 3 is composed, as shown in FIG. 7, of a nozzle body 30, which is made of a hollowed cylindrical member having a thinner leading end, and a needle member 31 which is made of a stepped rod member fitted in the nozzle body 30. The nozzle body 30 has its leading end portion formed with a swirl chamber 35 and an injection port which is made coaxial with the centrifugal chamber 35 has its needle tip 33 of conical shape abutting against the injection port 32 in a plugging manner. The larger-diameter portion forming a part of the needle tip 33 is formed, as shown in FIG. 7, with a groove-shaped slit 34, which extends along the outer circumferential wall of the larger-diameter portion and at a predetermined angle with respect to the axis thereof, and a communication chamber 36 which communicates with a fuel injection pump (not shown) by way of a fuel supply passage 37.

The fuel injection nozzle 3 establishes a hollowed conical spray pattern, and the angle, sectional area and length of said slit, the size of the centrifugal chamber 35, and the diameter and length of the injection port 32 are determined so that the spray angle $\theta$ of the fuel shown in FIG. 7 may take a value of 120 degrees. The diamater of the injection port 32 has been found suitable at 0.3 mm to 1.0 mm according to our experiments and is set at 1.0 mm in the present embodiment. On the other hand, the angle of thickness $\beta$ of the hollowed conical fuel spray shown in FIG. 7 cannot be made so large, and is selected within an angular range of 5 to 35 degrees.

Figure 6:
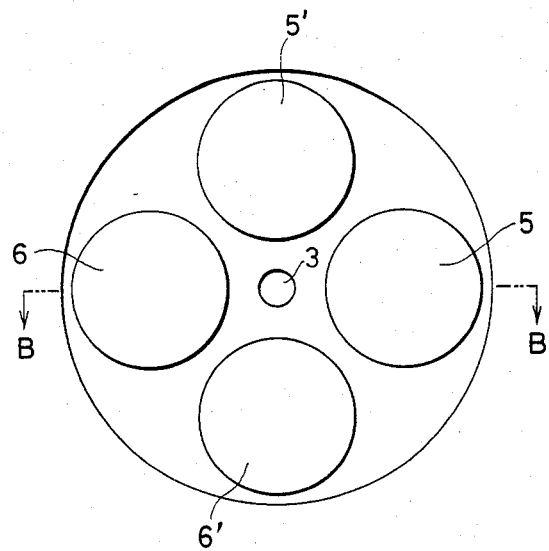

In the cylindrical head 4, as shown in FIG. 6, there are fitted and arranged two intake valves 5 and 5' and two exhaust valves 6 and 6' which surround the swirl injection nozzle 3 on four sides.

The intake passages, in which the intake valves 5 and 5' are arranged, are respectively formed with helical ports HP which are tuned to establish swirling flows (or swirls) having predetermined swirl ratios, as shown in FIG. 5.

In the direct injection internal combustion engine of the compression ignition type having the aforementioned construction according to the first embodiment, the intake air having been swirled by the helical ports HP is compressed in accordance with the rise of the piston 1; the swirls in the intake air have their swirling velocities properly suppressed by the viscosity of the air and frictional resistance with the cylinder wall. When the piston 1 approaches from 5 to 20 degrees before top dead center, the fuel injection is begun with the three-dimensional spray pattern of hollowed conical shape, which is injected from the swirl injection nozzle 3 with a tangential velocity component and with a large spray angle, so that the spray reaches to the vicinity of the inner wall surface of the opening of the cavity 2. When the piston 1 comes to about 10 degrees before top dead center, the fuel spray in the vicinity of the inner wall of the opening 2h is carried in the depthwise direction along the inner wall surface of the cavity 2 by the action of the squish S. which is established so as to flow from the flat surface of the piston 1 into the cavity 2 because the opening of the cavity 2 of the piston 1 is restricted, and is diffused and mixed by the additional action of the residing swirl so that it prepares an excellent mixture over the whole volume of the cavity 2, while being evaporated by the hot air having been adiabatically compressed at the end of the compression stroke, until the mixture is ignited. This ignition starts in the vicinity of the inner wall surface of the cavity 2, and the combustion reaches the central portion of the cavity 2 while being swirled by the swirl. When the piston passes over top dead center, the clearance between the flat surface of the top of the piston 1 and the lower wall surface of the cylinder head 4 is increased so that the gas in the cavity 2 intensely blows through the opening 2h until it is completely burned.

The direct injection internal combustion engine of the compression ignition type according to the first embodiment has advantages in that the fuel is prevented from forming coarse droplets or a liquid film by impingement. The swirl injection nozzle 3 has excellent fuel atomizing characteristics, and combustion is promoted to completion by generating turbulences by the action of the squish S. There is no impingement of the fuel spray upon the inner wall surface of the cavity 2 thanks to the use of the swirl injection nozzle 3 having weak fuel penetration.

As a result, the internal combustion engine of the first embodiment achieves advantages in that smoking is remarkably suppressed. The emission of hydrocarbons (HC), carbon monoxide (CO) and particulates (Ptc) or the like are reduced, and ignition delay is shortened while the noise is reduced to a low level because the fuel spray injected from the swirl injection nozzle 3 is carried by the squish S so as to be continuously distributed in the vicinity of the inner wall surface of the cavity 2.

Moreover, the internal combustion engine of the present first embodiment has an advantage in that the friction of the engine can be made low to enhance mechanical efficiency such that the specific fuel consumption can be reduced, attaining the aforementioned complete combustion, because there is no need to increase the compression ratio.

Because the swirl injection nozzle 3 having low fuel penetration is used, an intense swirl need not be established for avoiding the impingement of the fuel upon the inner wall surface of the cavity 2. Accordingly, the resistances of the intake ports and the helical ports in the vicinity of the intake valves to the intake air flow can be reduced. Furthermore, the internal combustion engine of the present first embodiment has an advantage in that the volumetric efficiencyy ($\eta v$) of the intake air can be enhanced to increase the flow rate of the air sucked into the same cylinder volume, so that the amount of fuel burned for the same air excess air can be increased to augment the engine output power.

The swirl injection nozzle 3 used in the internal combustion engine of the present first embodiment has an advantage in that the penetration of the fuel spray is low because its velocity is divided into a tangential component and a component in the injection flight direction (i.e., the radial direction) of the fuel spray, differently from the usual hole nozzle or the pintle nozzle which have their main velocity components in the injection flight direction of the fuel spray from the injection ports and with high penetration.

In the direct injection internal combustion engine of the present first embodiment, since the air swirling velocity is low but higher at the circumferential portion, the mixture is desired to be distributed either uniformly or thinner at the circumferential portion and thicker at the central portion. In the present first embodiment, the fuel is injected with a hollowed conical fuel spray pattern from the swirl injection nozzle 3 so that it is enabled to reach the vicinity of the inner wall surface in the vicinity of the opening 2h of the cavity 2 in cooperation with the swirl established in the cavity 2, while preventing the fuel from being accumulated at the cavity central portion in which the flow velocity of the swirl is low, but has a low penetration so that it does not impinge upon the inner wall surface of the cavity 2. The mixing and diffusion of the fuel droplets and air are achieved by the squish S which flows into the opening of the cavity tuned properly in the present first embodiment. Specifically, the fuel droplets having reached the vicinity of the inner wall surface of the cavity 2 are carried by the squish, while being mixed with the air, in the depthwise direction along the inner wall surface of the cavity so that they are uniformly distributed in the cavity 2. The fuel spray in the vicinity of that inner wall surface starts its ignition from the circumferential portion close to the inner wall, while being evaporated by the hot air having been adiabatically compressed at the end of the compression stroke, until the combustion promptly advances toward the central portion.

The direct injection internal combustion engine of the compression ignition type according to a second embodiment incorporates the first, second, third and fifth aspects of the present invention and is characterized in that a squish and a swirl, both being properly controlled, are established in the combustion chamber, and in that the fuel injection nozzle is spaced from the central axis of the cavity and inclined at a predetermined angle with respect to the central axis of the cavity. The internal combustion engine according to the second embodiment will be described in the following, while stressing the differences from the first embodiment, with reference to FIGS. 8, 9(A) and 9(B).

Figure 8:
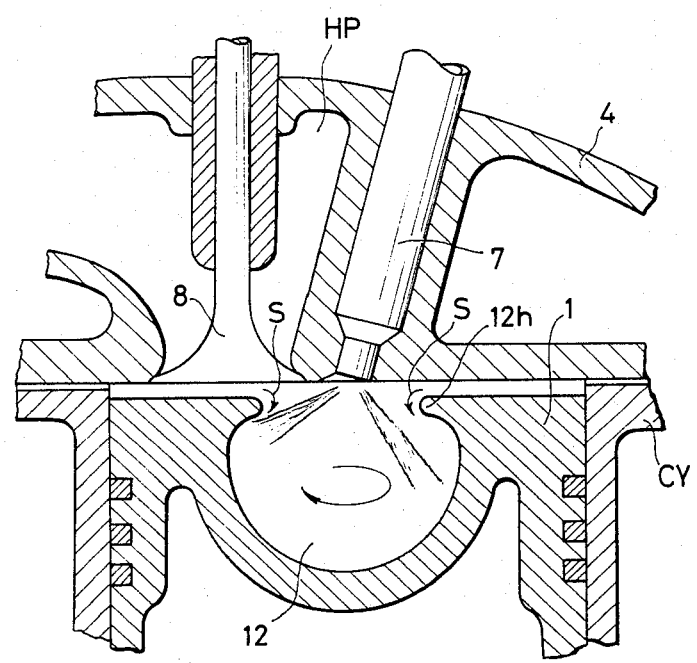
FIG. 8 and FIGS. 9(A) and 9(B) explain the internal combustion engine according to a second embodiment of the present invention.

As shown in FIG. 8, the piston 1 made reciprocally movable within the cylinder CY is formed at the central portion of its flat top surface with a spherical cavity 12 which forms a part of the combustion chamber. The area ratio A/Ao of the area A of the opening 12h of the cavity 12 to the area Ao of the piston top surface is set at 0.13. The diameter of the opening of the cavity 12 is set to 0.7 to 0.8 as large as that of the other portions, (i.e., the maximum inner diameter of the cavity 12) thus constructing the throttle.

Figure 9A:
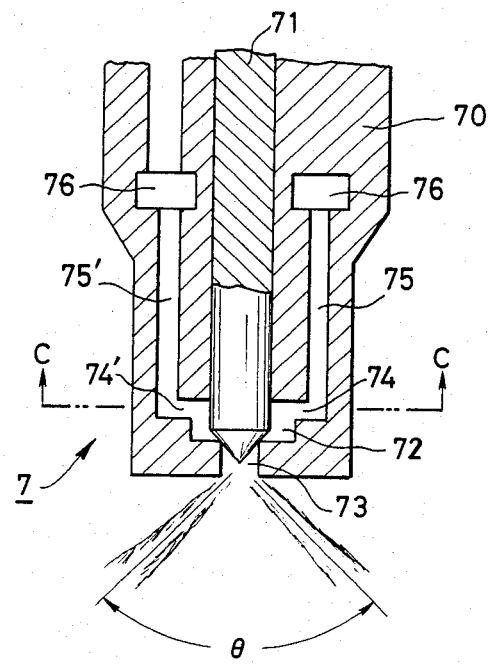
Figure 9B:
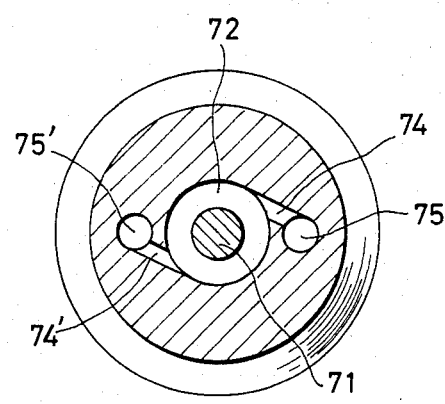

The fuel injection nozzle is constructed, as shown in FIGS. 9(A) and 9(B), of a swirl injection nozzle 7 which is arranged to extend through the cylinder head 4, to have its injection port slightly offset from the axis of the cavity 12 and to have its axis inclined about 15 degrees with respect to the axis of the cavity 12.

The swirl injection nozzle 7 is composed, as shown in FIGS. 9(A) and 9(B), of a nozzle body 70 of a hollowed cylindrical member having its leading end made slightly thinner than the other portions, and a needle member 21 of a rod member fitted in the nozzle body 70 and having a leading end of conical shape. The nozzle body 70 has its leading end formed with a swirl chamber 72 having a predetermined diameter. The nozzle body 70 is formed with two tangential passages 74 and 74', which are tangentially opened into the swirl chamber 72, at two right and left opposing positions of FIGS. 9(A) and 9(B), and with an injection port 73 which is made coaxial and has a predetermined diameter (e.g., 0.6 mm). The tangential passage 74 communicates through fuel supply passages 75 and 75', which are juxtaposed in parallel within the nozzle body 70, with an annular passage 76 which in turn communicates with a fuel injection pump (not shown).

In the present swirl injection nozzle 7, the diameter and length of the injection port 73, the size of the centrifugal chamber 72, and the sectional area and length of the tangential passages 74 and 74' are determined so that the fuel may be injected with the fuel spray pattern having an spray angle of about 90 degrees. In the present second embodiment, the fuel spray at the right hand side of FIG. 8 in the cavity 12 has to be directed upwardly of the 0.9L depth position of the cavity 12.

In the cylinder head 4, as shown in FIG. 8, there are fitted and arranged one intake valve 8 having its opening area enlarged, and one exhaust valve (not shown).

The intake passage, in which the intake valve 8 is arranged, is formed, as shown in FIG. 8, with a helical port HP or a swirl port which is tuned to establish a swirling flow (or swirl) having a predetermined swirl ratio.

In the direct injection internal combustion engine of the compression ignition type having the aforementioned construction according to the second embodiment, since the fuel is injected into the cavity 12 in a hollowed conical shape from the swirl injection nozzle 7 as is shown in FIG. 8, a region having no fuel seems to appear between the righthand inner wall surface of the cavity 12 and the fuel spray. Since a suitable swirl is established in the cavity 12, however, the fuel spray at the lefthand side of the cavity flows around so that it spreads over all the cavity 12 to thereby prepare an excellent mixture. As a result, the internal combustion chamber of the present second embodiment can enjoy operational effects similar to those of the foregoing first embodiment.

The internal combustion engine of the present second embodiment has advantages in that it can use a fuel injection nozzle having a small spray angle θ of the fuel spray pattern, and in that the injection port is less blotted with carbon because its diameter can be made smaller than that of the first embodiment, whereby the injection velocity can be accordingly high.

Since the position of the fuel spray, which is directed toward the inner wall surface of the cavity 12, in the depthwise direction has a certain width, the internal combustion engine of the present second embodiment has advantages in that the dispersion of the fuel in the depthwise direction of the cavity 12 can be improved, and in that a uniform and excellent mixture can be prepared in the depthwise direction of the cavity even in an internal combustion engine wherein it is not possible to intensify the squish S.

Since the fuel injection nozzle is arranged at an inclination and since the intake valve and the exhaust valve are one in number, furthermore, the internal combustion engine of the present second embodiment has an advantage such that it can be applied to a compression ignition type direct injection internal combustion engine of small size, which frequently includes one intake valve and one exhaust valve.

The present invention should not be limited to the embodiments thus far described, but varieties of design changes, additions and modifications can be made within the scope of the invention as defined in the appended claims.

What is claimed is:

1. A direct injection internal combustion engine of a compression ignition type comprising:
   a piston reciprocated within a cylinder,
   a cavity formed in a top surface of said piston, said cavity being formed in said piston top surface so as to have its inlet opening throttled while allowing remaining portions to have a large cross-sectional area, the ratio of the area A of said inlet opening to the area Ao of said piston top surface satisfying the following relationship:

$0.07 \leq A/Ao \leq 0.25$;

and a fuel injection nozzle, comprising; fuel swirling means for effecting a swirling motion of the fuel, and an injection port positioned at the central portion of said cavity and directed within the cavity,
   said nozzle injecting fuel from said injection port toward the circumferential wall of said cavity in a spray pattern of a hollowed conical shape having a predetermined spray angle and tangential velocity component.

2. A direct injection internal combustion engine of a compression ignition type as set forth in claim 1, wherein intake means for supplying intake air into said combustion chamber is provided with swirling means for swirling said intake air so that a swirl may be established in said cavity.

3. A direct injection internal combustion engine of a compression ignition type as set forth in claim 1, wherein said spray angle and the position of said injection port of said fuel injection nozzle are determined so that the fuel spray injected from the injection port is directed toward the inner circumferential wall of said cavity below a straight line on which said injection port and the inner wall of the restricted opening of said cavity are tangential, and above a straight line which joins said injection port and such a portion of said cavity as has a depth of 0.9L from said opening when the depth of said cavity is represented by L.

4. A direct injection internal combustion engine of a compression ignition type as set forth in claim 1, wherein said injection port of said fuel injection nozzle is arranged so as to inject fuel into a region of said opening having a diameter 0.5 times as large as that of said opening.

5. A direct injection internal combustion engine of a compression ignition type as set forth in claim 1, wherein said fuel injection nozzle injection port is substantially aligned with the central axis of said cavity whereby said injection port injects the fuel uniformly over the whole circumference of the inner wall of said cavity.

6. A direct injection internal combustion engine of a compression ignition type as set forth in claim 2, wherein said fuel injection nozzle injection port is spaced a predetermined distance from the central axis of said cavity and is inclined at a predetermined angle with respect to the central axis of said cavity.

7. A direct injection internal combustion engine of a compression ignition type as set forth in claim 1, wherein said cavity of said piston is formed into a spherical shape.

8. A direct injection internal combustion engine of a compression ignition type as set forth in claim 1, wherein said cavity of said piston is formed into a cylindrical shape.

9. A direct injection internal combustion engine of a compression ignition type as set forth in claim 1, wherein said fuel injection nozzle comprises a swirl injection nozzle of the slit type comprising a nozzle body of a hollow cylindrical body having a injection port at end portion thereof, a needle tip, having a groove-shaped slit extends along an outer circumferential wall thereof and a conical tip portion at end portion therof, inserted into said nozzle body.

10. A direct injection internal combustion engine of a compression ignition type as set forth in claim 1 wherein said fuel injection nozzle comprises a swirl injection nozzle comprising a nozzle body of a hollow cylindrical body having a injection port at end portion thereof, a needle member of a rod member inserted into said nozzle body, swirl chamber formed within said nozzle body and needle member and connected to said injection port, and two tangential passage tangentially opened into said swirl chamber and connected to fuel supply passages.

11. A direct injection internal combustion engine of a compression ignition type as set forth in claim 5, wherein said cavity of said piston is formed into a spherical shape, and said fuel injection nozzle comprises a swirl injection nozzle of the slit type comprising a nozzle body of a follow cylindrical body having a injection port at end portion thereof, a needle tip, having a groove-shaped slit extending along an outer circumferential wall thereof and a conical tip portion at end portion thereof, inserted into said nozzle body.

12. A direct injection internal combustion engine of a compression ignition type as set forth in claim 6, wherein said cavity of said piston is formed into a cylindrical shape, and said fuel injection nozzle comprise a swirl injection nozzle comprising a nozzle body of a hollow cylindrical body having an injection port at an end portion thereof, a needle member of a rod member inserted into said nozzle body, a swirl chamber formed within said nozzle body and needle member and connected to said injection port, and two tangential passages tangentially opened into said swirl chamber and connected to fuel supply passages.

* * * * *